United States Patent [19]

Meiners

[11] 4,452,320
[45] Jun. 5, 1984

[54] ADJUSTABLE DANISH TINE

[75] Inventor: Elmo R. Meiners, Anchor, Ill.

[73] Assignee: M & W Gear Company, Gibson City, Ill.

[21] Appl. No.: 312,907

[22] Filed: Oct. 19, 1981

[51] Int. Cl.³ ............................................. A01B 23/02
[52] U.S. Cl. .................................... 172/708; 172/744; 172/763
[58] Field of Search ............... 172/744, 713, 707, 708, 172/763, 753, 694, 695, 697, 551

[56] References Cited

U.S. PATENT DOCUMENTS

| 447,864 | 3/1891 | Burrell | 172/763 |
| 451,252 | 4/1891 | Barton | 172/763 |
| 514,836 | 2/1894 | Ovenshire | 172/707 |
| 668,937 | 2/1901 | Todd | 172/713 X |
| 1,310,924 | 7/1919 | Ono | 172/551 |
| 1,622,619 | 3/1927 | Warren | 172/763 X |
| 1,838,355 | 12/1931 | Benjamin | 172/708 X |
| 3,896,883 | 7/1975 | Howes | 172/707 |

FOREIGN PATENT DOCUMENTS

| 677405 | 1/1964 | Canada | 172/763 |
| 42761 | 8/1930 | Denmark | 172/708 |
| 1936 | of 1903 | United Kingdom | 172/708 |

Primary Examiner—Richard J. Johnson
Attorney, Agent, or Firm—Allegretti, Newitt, Witcoff & McAndrews, Ltd.

[57] ABSTRACT

An adjustable Danish tine for a farm implement includes a notched vertical run for attachment to a tool bar by a U clamp.

1 Claim, 3 Drawing Figures

ADJUSTABLE DANISH TINE

BACKGROUND OF THE INVENTION

This invention relates to an improved Danish tine construction and more particularly to the combination of a Danish tine with a tool bar wherein the tine is adjustable with respect to the tool bar.

A Danish tine is a specific type of minimum tillage farm implement wherein a rod or bar of spring steel is bent into the form of an S. One end of the rod is pointed or shaped for tilling the soil. The opposite end is curved and mounted on a tool bar. The resiliency or spring of the bar enhances the tillage operation performed by the Danish tine.

Generally a series of Danish tines are attached to a tool bar to provide a minimum tillage implement which can till a specific width of earth as it be moves through a field. A need often arises, however, depending upon the soil conditions, season and other factors, to adjust the depth of soil penetration by the tines. Heretofore such depth adjustment was effected by providing an adjustable wheel mounting mechanism or running gear for the implement which would raise or lower the tool bar and thereby raise or lower the tines as desired. The present invention contemplates a more flexible and less expensive construction for accomplishing the objectives provided by the prior art adjustable running gear.

SUMMARY OF THE INVENTION

Briefly, the present invention comprises an adjustable Danish tine wherein the adjustment is incorporated in the connection of the tine to the tool bar. The tine thus includes a vertical extension or run and a special clamping mechanism which may be adjusted to permit movement and retention of each separate tine vertically upward or downward as desired.

An object of the present invention is to provide an improved Danish tine construction.

A further object of the invention is to provide an improved, adjustable Danish tine having a simple and economical construction.

Still a further object of the present invention is to provide an adjustable Danish tine which has a rugged construction and which structurally satisfies the need for a strong, minimum tillage farm implement.

These and other objects, advantages and features of the invention will be set forth in the detailed discussion which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
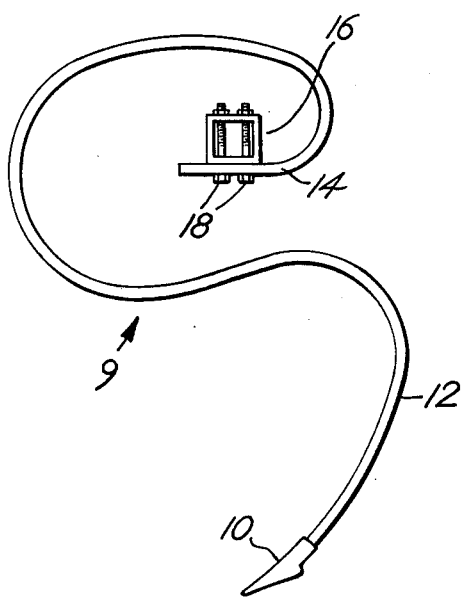
FIG. 1 is a side elevation of a typical, prior art Danish tine.

FIG. 1 illustrates a typical prior art Danish tine 9. Danish tine 9 includes a piercing end or point 10, a curved S shaped connecting rod 12, and a terminating, curved, attachment extension 14. The tine 9 is normally attached to a tool bar 16. Thus the tine 9 and in particular the connecting extension 14 is affixed or bolted to the tool bar 16 by means of U bolts or clamps 18. The bolts or clamps 18 fit through openings in the tool bar 16 and tightly compress and attach the Danish tine 9 to the tool bar 16. Normally a series of tines 9 are attached in a side-by-side array on a tool bar 16.

In order to adjust the depth of penetration of the point 10 into the soil during a tilling operation, it is necessary to raise or lower the entire tool bar 16. This is normally accomplished by use of an adjustable running gear for the tool bar 16. When Danish tines 9 are used in combination with some other farm tools, such as rakes or colters, lowering or raising the entire tool bar 16 may be undesired. That is, it may be desirable to adjust only the depth of the Danish tine 9 and maintain the other implements at their previous depth. However, use of adjustable running gear will generally not permit individual adjustment of the tines 9.

Figure 2:
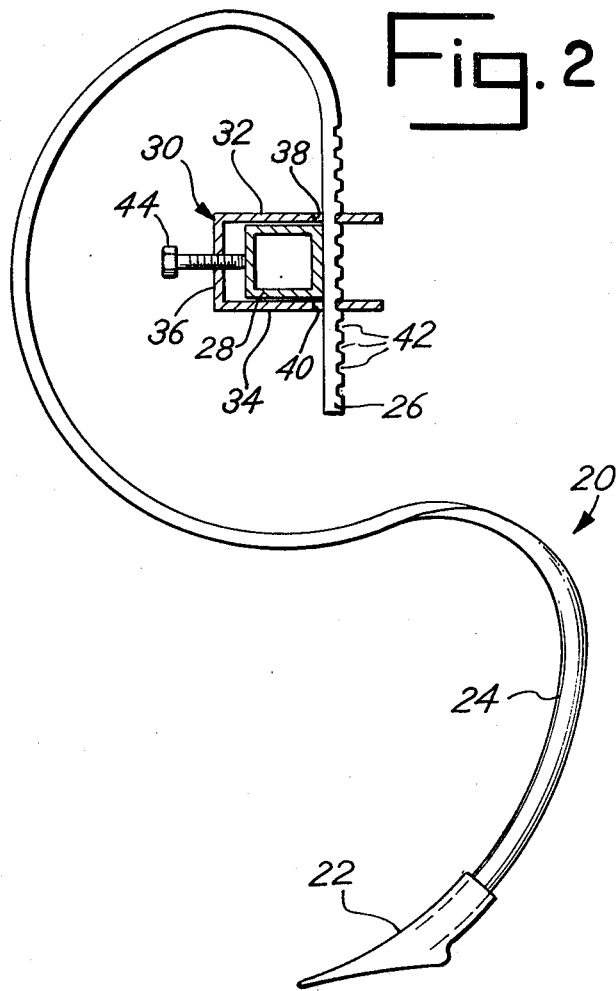
FIG. 2 is a side elevation of the improved Danish tine of the present invention.
Figure 3:
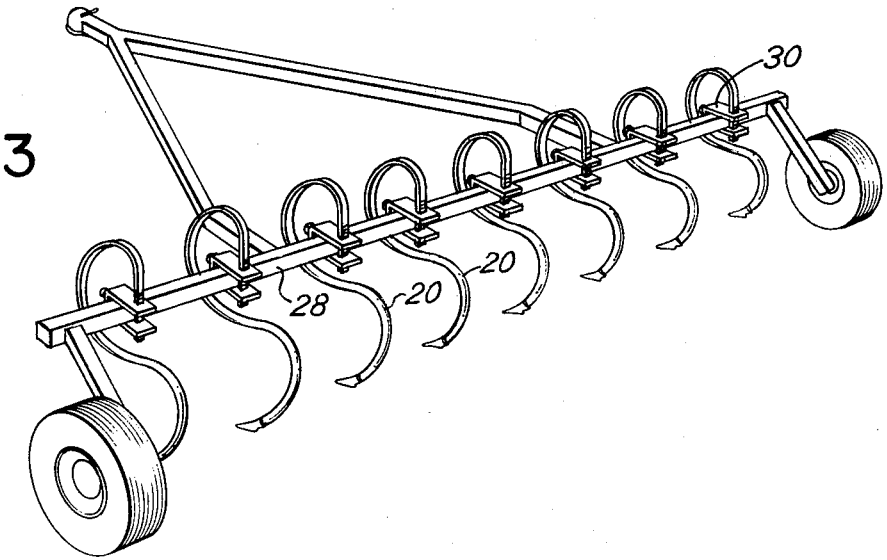
FIG. 3 is a perspective view illustrating the construction and operation of the improved adjustable tine of the present invention.

FIG. 2 illustrates an adjustable Danish tine 20 wherein each tine 20 may be independently set to a desired depth of penetration into the soil. Referring to FIG. 2, the tine 20 includes a piercing end 22, an S shaped connecting rod 24, and a vertical attachment run or extension 26 at its upper end. A tool bar 28 is provided for receipt and attachment of the tine 20. A U clamp 30 having first and second legs 32 and 34 connected by a crown section 36 is used to attach the tine 20 and more particularly the vertical run 26 to the tool bar 28.

The clamp 30 includes passages 38 and 40 in its opposite legs 32 and 34 respectively, for receipt of the vertical run 26. The vertical run 26 includes a plurality of notches 42 which are cooperative with the openings 38 and 40. The appropriate notches 42 may thus be aligned with the openings 38 and 40. A draw bolt 44 is threaded through the crown 36 and is used to draw the legs 32, 34 in a manner which retains the vertical run tightly against the tool bar 28. In this manner, the tine depth may be adjusted and the tine 20 may then be rigidly fixed on the tool bar 28.

Other means of attachment and movement of the tine are possible. The specific U clamp construction of the present invention is advantageous, however, because the U clamp serves a multiplicity of functions including retention of the tine 20 on the tool bar 28 and adjustment of the tine with respect to the level of the soil. Thus, while there has been set forth a preferred embodiment of the invention, it is to be understood that the invention is to be limited only by the following claims and their equivalents.

What is claimed is:

1. An adjustable Danish tine in combination with a farm implement tool bar comprising:

a Danish tine having a vertical tool bar attachment end, a curved connecting run and a soil piercing end, the vertical tool bar attachment end defining a vertical run;

a tool bar generally transverse to the vertical run for attachment with the vertical run, said vertical run extending upwardly and transforming into the curved connecting run, said curved connecting run extending forwardly over the tool bar;

a U clamp having two projecting legs connected by a crown, the legs including opposed openings for slidable receipt of the vertical run, the clamp fitting over the tool bar with the legs straddling the tool bar, the crown opposed to one side thereof, the opposite side thereof being engaged by the vertical run which passes through the opposed openings; and bolt means for adjusting the spacing of the crown from the tool bar and tightening the vertical run against the tool bar, said vertical run including a plurality of notches cooperative with the clamp for setting vertical adjustment of the tine on the tool bar, said bolt means being positioned intermediate the curved connecting run and the tool bar.

* * * * *